(12) United States Patent
George (10) Patent No.: US 6,636,939 B1
(45) Date of Patent: Oct. 21, 2003

(54) METHOD AND APPARATUS FOR PROCESSOR BYPASS PATH TO SYSTEM MEMORY

(75) Inventor: Varghese George, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 52 days.

(21) Appl. No.: 09/607,537

(22) Filed: Jun. 29, 2000

(51) Int. Cl.[7] .............................................. G06F 12/00
(52) U.S. Cl. ...................... 711/111; 711/141; 711/146; 711/150; 711/149; 710/107; 710/112; 714/43
(58) Field of Search .............................. 711/150, 149, 711/100, 146, 111; 710/107–111; 714/43

(56) References Cited

U.S. PATENT DOCUMENTS

| | | | | |
|---|---|---|---|---|
| 4,245,344 A | * | 1/1981 | Richter ......................... | 714/43 |
| 5,530,933 A | * | 6/1996 | Frink et al. .................. | 711/119 |
| 5,659,715 A | * | 8/1997 | Wu et al. ..................... | 345/531 |
| 5,678,009 A | * | 10/1997 | Bains et al. ................. | 710/125 |
| 5,751,996 A | * | 5/1998 | Glew et al. .................. | 711/119 |
| 5,860,001 A | * | 1/1999 | Cromer et al. ................. | 713/1 |
| 5,911,149 A | * | 6/1999 | Luan et al. .................. | 709/215 |
| 5,922,046 A | * | 7/1999 | Thomas et al. .............. | 709/212 |
| 6,052,133 A | * | 4/2000 | Kang .......................... | 345/519 |
| 6,061,748 A | * | 5/2000 | Taglione et al. ............. | 370/276 |
| 6,088,785 A | * | 7/2000 | Hudson et al. ................ | 712/35 |
| 6,131,140 A | * | 10/2000 | Rodgers et al. ............. | 711/100 |
| 6,317,799 B1 | * | 11/2001 | Futral et al. ................. | 709/212 |
| 6,341,100 B1 | * | 1/2002 | Fujioka ................. | 365/230.03 |
| 6,370,631 B1 | * | 4/2002 | Dye ........................... | 345/619 |

\* cited by examiner

*Primary Examiner*—Matthew Kim
*Assistant Examiner*—Zhou H Li
(74) *Attorney, Agent, or Firm*—Blakely, Sokoloff, Taylor & Zafman LLP (57) ABSTRACT

A memory interface unit is described having a first interface to receive a first request from a processor where the first request has an attribute. The memory interface unit also has a second interface to receive a second request from the processor where the second request does not have the attribute. The memory interface unit also has a third interface to read/write information from/to a system memory. A method is also described that involves forwarding a processor request along a first path to a memory interface unit if the request has one or more attributes; and forwarding the request along a second path to the memory interface unit if the processor request does not have the one or more attributes.

50 Claims, 4 Drawing Sheets

METHOD AND APPARATUS FOR PROCESSOR BYPASS PATH TO SYSTEM MEMORY

FIELD OF THE INVENTION

The field of invention relates to computing system architecture; and, more specifically, to reducing the latency of a processor that seeks information located within system memory.

BACKGROUND

Processors are used in computing systems and are implemented within a semiconductor chip. Processors execute instructions that typically operate upon data elements in order to implement a software program. The instructions and data elements used by a processor to implement a software program are stored in a memory structure (e.g., an L1 cache, L2 cache and/or system memory) and fetched by the processor prior to their being used. Each instruction and data element has a corresponding address so that it may be obtained from a particular memory structure location. The L1 and L2 caches are typically partitioned so that instructions are within one partition while data elements are in another partition.

Figure 1:
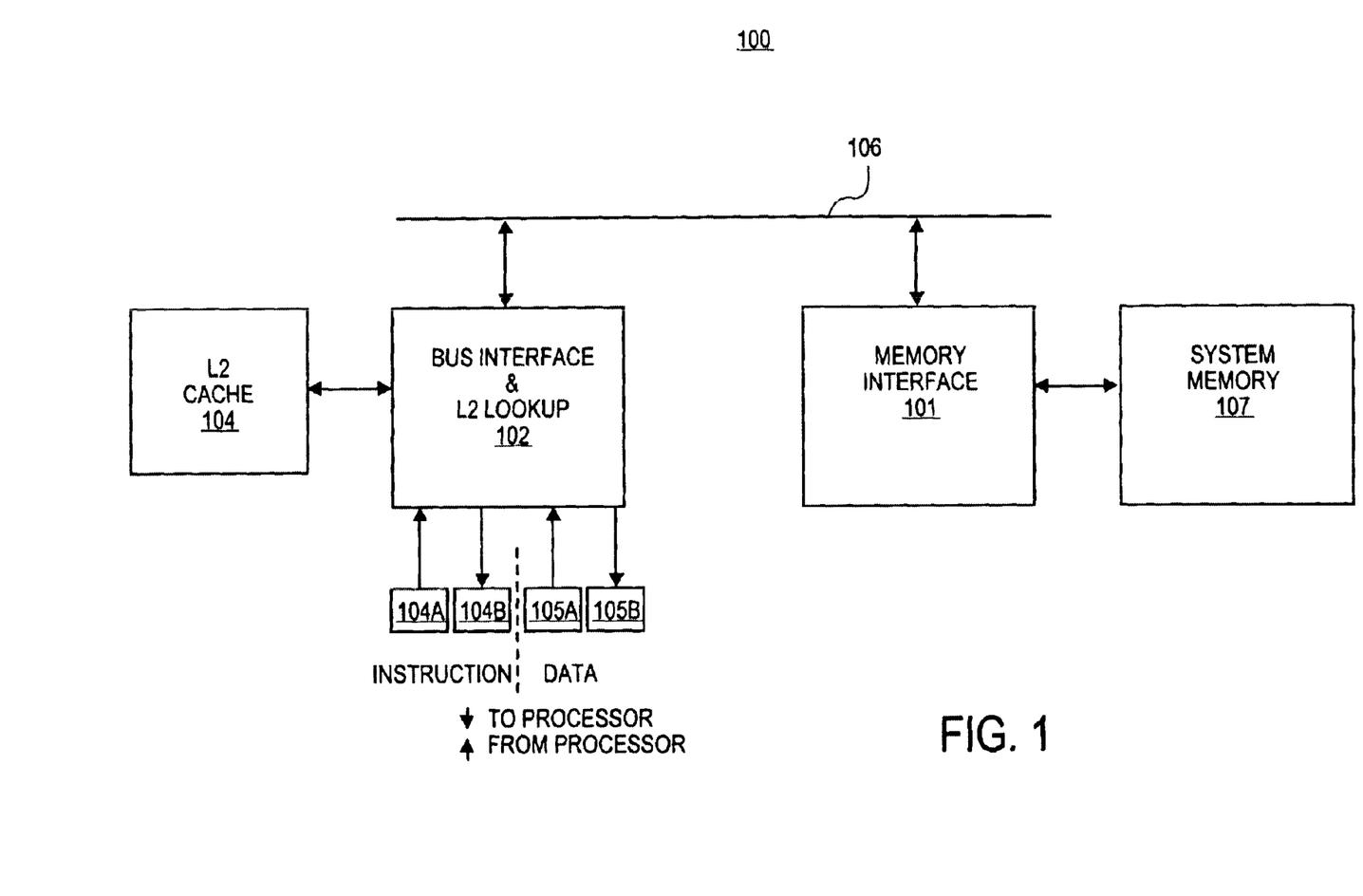
FIG. 1 shows a portion of a system architecture.

FIG. 1 shows a portion 100 of a typical computing system. The system portion 100 of FIG. 1 includes a system bus 106 coupled to a memory interface unit 101 and a bus interface/L2 lookup unit 102. The memory interface unit is coupled to system memory 107. The bus interface/L2 lookup unit 102 is coupled to an L2 cache 104, a pair of instruction fetch queues 104a,b and a pair of data element fetch queues 105a,b.

When a processor needs an instruction or data element, the L1 cache (not shown in FIG. 1) is first checked. If the desired instruction or data element is not present in the L1 cache, a request is placed in the appropriate queue 104a, 105a (i.e., an instruction fetch request is placed in the outbound instruction fetch queue 104a or a data element fetch request is placed in the outbound data element queue 105b).

The L2 cache 104 is next checked. That is, the request in the appropriate queue 104a, 105a is effectively forwarded to the bus interface/L2 lookup unit 102. The bus interface/L2 lookup unit 102 searches the L2 cache 104 for the requested information. If the desired instruction or data element is not present in the L2 cache 104, the request is effectively forwarded to the memory interface unit 101 via the system bus 106. This action is commonly referred to as a memory read.

The memory interface unit 101 (e.g., a memory controller) then retrieves (i.e., reads) the desired information from system memory 107. The retrieved information is then sent from the memory interface unit 101 over system bus 106 to the bus interface/L2 lookup unit 102. The bus interface/L2 lookup unit 102 then forwards the retrieved information into the appropriate queue 104b, 105b (i.e., an instruction is placed in the inbound instruction fetch queue 104b or a data element is placed in the inbound data element queue 105b). The processor then uses the retrieved instruction or data element to continue execution of the software program.

The various levels of memory structure (e.g., L1 cache, L2 cache 104 and main memory 107) demonstrate a cost-performance balance. L1 and L2 caches are typically implemented with static random access memory (SRAM) cells while main memory 107 is implemented with dynamic random access memory (DRAM) cells.

DRAM memory cells are typically slower and cheaper than SRAM memory cells, resulting in greater latency (and reduced system performance) whenever information is retrieved or stored from/to system memory 107. Also, the memory space of main memory 107 is usually larger than the combined memory spaces of the L1 and L2 caches.

With this approach, most of the information stored within the computing system is inexpensively stored in main memory 107. The slower speed of the main memory 107 (and corresponding reduction in system performance) is offset by enhanced utilization of the L1 and L2 caches. Because L1 and L2 caches are typically formed with SRAM cells, they are comparatively faster and more expensive than main memory to implement per unit of memory space.

To minimize the cost of their implementation, L1 and L2 caches have less combined memory space than main memory 107 as mentioned above. However, to take advantage of their faster speed in order to maximize their contribution to system performance, they are configured to be used more frequently than main memory 107.

Thus, a computing system is designed (e.g., via prediction) with the intention that instructions or data elements needed at any instant of time by a processor are more likely to found in the L1 and L2 caches rather than the main memory 107.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

A memory interface unit is described having a first interface to receive a first request from a processor where the first request has an attribute. The memory interface unit also has a second interface to receive a second request from the processor where the second request does not have the attribute. The memory interface unit also has a third interface for reading/writing information from/to a system memory. A method is also described that involves forwarding a processor request along a first path to a memory interface unit if the request has one or more attributes; and forwarding the request along a second path to the memory interface unit if the processor request does not have the one or more attributes.

Recall from the background that a computing system is typically designed (e.g., via prediction) with the intention that instructions or data elements needed at any instant of time by a processor are more likely to found in the L1 and L2 caches rather than in the main memory 107.

Unfortunately, even though a system is designed with such an intention, the intention is not realized in many cases. That is, in a noticeable number of instants the instruction or data element needed by the processor is neither in the L1 cache or L2 cache. This causes the processor to idly wait not only during the comparatively slower read from main memory 107 but also while the request from the processor and the information retrieved from main memory 107 are transported over system bus 106.

A significant portion of the time spent waiting for transportation over system bus 106 is the delay waiting for use of the system bus 106. System bus 106 is aptly named because it provides a communication path for devices or elements in the computing system other than the processor and the bus interface/L2 cache lookup unit 102 that may also use system memory 107 (e.g., a Direct Memory Access (DMA) controller, a bridge device from the system bus to another bus; and/or a graphics controller). No such devices are shown in FIG. 1 for simplicity. Examples of system bus 106 include, among others not listed here: 1) any of the CPU front-end buses offered from Intel Corporation of Santa Clara, Calif.; 2) a Peripheral Component Interconnect (PCI) bus; 3) as well as Alpha bus architectures.

Thus, because other system elements may be providing traffic to the system bus 106, the processor may have to wait before its request is delivered to the memory interface unit 101. This involves, as just a few examples: queuing the processor request while the bus interface/L2 lookup 102 waits to effectively gain control of the system bus 106; and handshaking with one or more devices coupled to the system bus 106 to obtain permission to use the system bus 106

Another significant portion of time is spent formatting the request from the processor (and the information retrieved from main memory 107) by the bus interface/L2 lookup unit 102 (and the memory interface unit 101). For example, bus interface/L2 lookup unit 102 has to format a request from the processor for delivery to the memory interface 101 over system bus 106.

This involves, as an example, identifying and appending the address of the memory interface unit 101 to the request so that the request from the processor is properly directed to the memory interface unit 101 rather than some other device that is coupled to the system bus 106. Note that the processor request is typically in the form of a memory address.

Similar forms of overhead are involved when: 1) receiving within the memory interface unit 101 a processor request sent by the bus interface/L2 lookup unit 102 over system bus 106; 2) transmitting from the memory interface unit 101 information retrieved from system memory 107 to bus interface/L2 lookup unit 101 via system bus 106; and 3) receiving within the bus interface/L2 lookup unit 102 information retrieved from system memory 107 and sent by memory interface unit 101 over system bus 206.

The overhead associated with the transmitting and receiving described above adds to the time that the processor must endure while waiting for the information that is retrieved from main memory 107. The longer the processor must wait, the more the performance of the computing system is reduced.

System performance may be increased by designing the system portion 100 such that the transmitting and receiving described above is avoided for instruction or data element processor requests (i.e., for memory reads from system memory 107). That is, referring to FIG. 2, a bypass path (hereinafter referred to as a shortcut 210 for simplicity) is designed into the bus interface/L2 lookup unit 202 and memory interface unit 201 that avoids use of the system bus 206. Memory reads are therefore streamlined to system memory 207 via shortcut 210.

Figure 2:
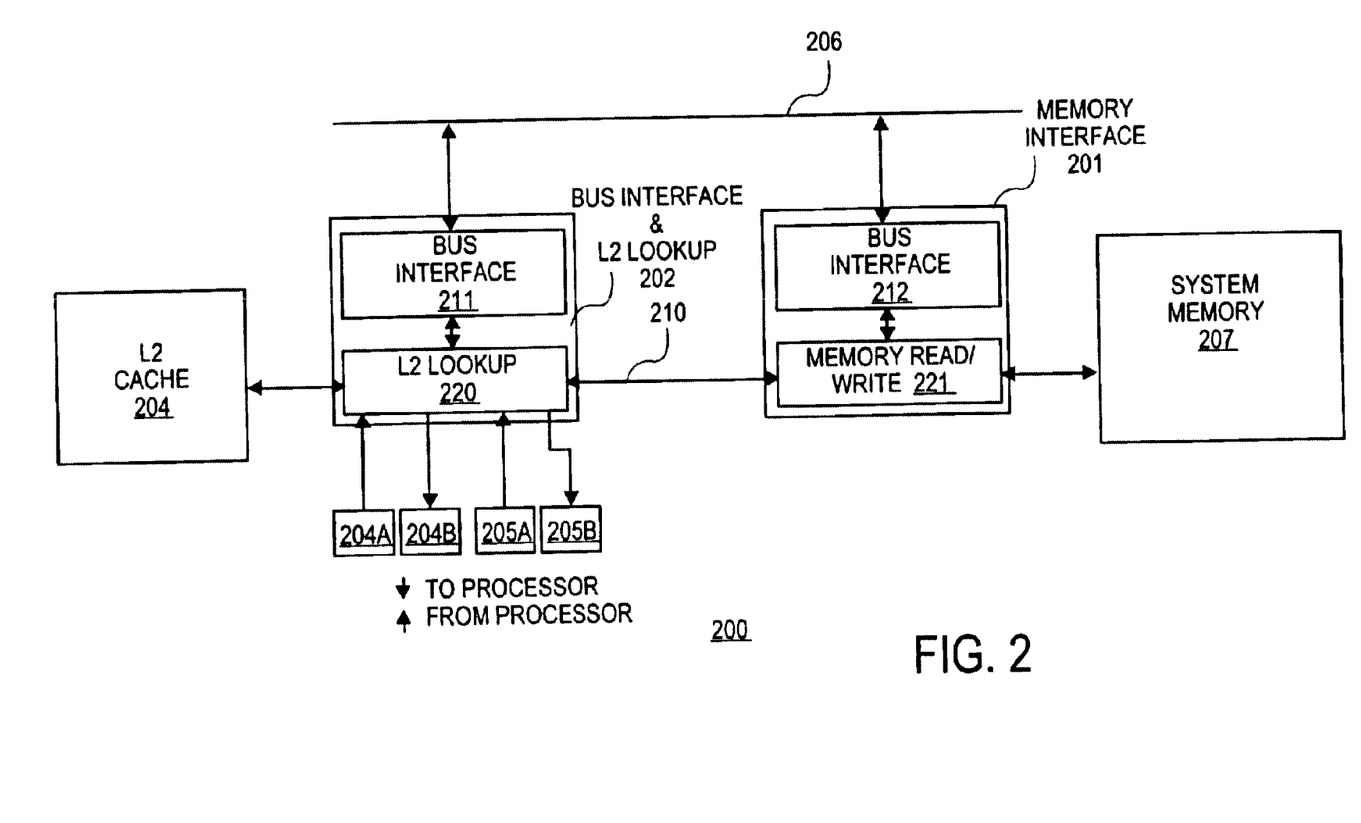
FIG. 2 shows a portion of a system architecture having a shortcut to the memory interface unit.

By avoiding the system bus 206 for a memory read, the bus interface logic 211, 212 that enables transmission over system bus 206 is also avoided. Removing this logic 211, 212 from the pathway of a memory read reduces the time the processor must wait for the memory read to be performed. Shortcut 210 may be any form of communicative coupling (e.g., a serial channel, a bus, etc.) that allows for the transportation of data between different logical entities. The communicative coupling may also be synchronous or asynchronous (noting that the memory interface 201 and bus interface/L2 lookup 202 may have the same or different clocking sources).

FIG. 2 shows the bus interface/L2 lookup unit 102 of FIG. 1 partitioned into a bus interface unit 211 and a L2 lookup unit 220. The bus interface unit 211 transmits processor requests for transportation over system bus 206 and receives information retrieved from system memory 207 from system bus 206. L2 lookup unit 220 performs a lookup of the contents of the L2 cache for the instruction or data requested by the processor.

FIG. 2 also shows the memory interface unit 101 of FIG. 1 partitioned into a bus interface unit 212 and a read/write logic unit 221. The bus interface unit 212 receives processor requests from system bus 206 and transmits information retrieved from system memory 207 for transportation over system bus 206. Read/write logic unit 221 performs the reading and writing of information from/to system memory 207.

Note that the system bus 206 may still used to support other types of external processor transactions besides a memory read. For example, a memory write may still use the system bus 206. A memory write occurs when the processor needs to write information into system memory 207. Other types of transactions that may still use the system bus 206 such as "special cycles". Special cycles may include, for example, an interrupt acknowledge cycle that addresses an interrupt controller within the system to acknowledge the receipt of an interrupt.

The approach of FIG. 2 may be viewed as an extension of the cost performance balance discussed in the background. Because memory reads, in many environments, are the most common (or a more common) type of external processor transaction (i.e., outside the L1 or L2 caches and the processor itself), a noticeable improvement in system performance may be realized if the latency associated with the memory read is shortened.

In various other environments, other types of transactions may be more prevalent. For example, in digital signal processor (DSP) type of environments, data element reads and data element writes may be more prevalent (rather than data element reads and instruction fetches as discussed above). Thus, an alternate embodiment would include designing the shortcut 210 of FIG. 2 for data element reads and data element writes.

Returning to the original embodiment, where memory reads (in the form of instruction fetches and data element reads) take advantage of the shortcut 210 designed around system bus 206, note that a memory read may have one or more attributes that characterize the memory read. These attributes may specify additional operations and/or conditions as to how the processor request or the retrieved information is to be handled and/or the environment that the memory read is performed under.

Some of these attributes may present certain complications. if these complications are designed to be handled by the avoided bus interface logic 211, 212, it may be more efficient to allow a "complicated" memory read to traverse the system bus 206 so that the bus interface logic 211, 212 that operates upon the processor request or retrieved information can handle the complication. That is, it may be more efficient to deny use of the shortcut 210 for a complicated memory read than design complication handling circuitry into the shortcut 210.

Thus, whether or not it is efficient to deny use of the shortcut 210 for certain types of attributes depends upon the frequency of the attribute and the difficulty (or ease) of designing the ability to handle the complication presented by the attribute into the shortcut 210. Some attributes may arise sufficiently infrequently and/or the difficulty of designing into the shortcut 210 the ability to handle the complication presented by the attribute is great enough that any memory reads having any such attributes are denied use of the shortcut 210.

Other attributes may arise sufficiently frequently and/or the difficulty of designing into the shortcut 210 the ability to handle the complication presented by the attribute is small enough that memory reads having any such attributes are not automatically denied use of the shortcut 210. Since these factors may vary from embodiment to embodiment, those of ordinary skill may decide what approach is best suited for their particular embodiment. A discussion of some of these attributes follows.

One type of attribute may be referred to as a "read for ownership" (RFO) attribute. Typically, there are three types of memory reads, a normal instruction read (submitted from the outbound instruction fetch queue 204a), a normal data read (submitted from the outbound data element queue 205a) and an RFO data read (submitted from the outbound data element queue 205a). If a memory read is labeled as an RFO, the information read from the memory read is going to be written over shortly after the read from system memory 207 is performed. Normal reads are not presented with such a "limited lifetime" warning.

By labeling a memory read as an RFO, the other elements in the system are effectively given notice that the present data in system memory 207 (at the location where the memory read is going to take place) is going to be replaced soon. Thus, upon such notification, other elements that have the current information can take action to invalidate their copy of this information within their local caches, queues, registers, etc.

For a system that supports RFO memory reads, bus interface logic 211 typically has logic that detects the RFO notice and helps deliver the RFO notice to other elements in the system (e.g., by broadcasting the RFO notification over the system bus 206). Some designers may choose to let all RFO memory reads pass over the system bus 206 so that this logic can be utilized. Other designers may choose to add such logic to the shortcut 210 path.

Another type of attribute may be referred to as a "self-snoop". Self snooping involves the checking of other locations, besides the L1 cache, L2 cache and system memory 207, for the information desired by the processor's request. Sometimes during system operation a concern arises that stale data is found in the L1, L2 caches and/or system memory 207. That is, more up to date information may be found in other places. If so, the processor request is given a "self snoop" attribute.

For example, if the desired instruction(s) for an instruction fetch potentially exist within the CPU's L1 data cache (in a modified state) a self snoop attribute may be appended to the processor request. That is, because the instruction may be found in the L1 data cache partition rather than within the L1 or L2 instruction cache partitions, the system looks for the information in places (e.g., the L1 data cache partition) other than the L1 instruction cache partition, L2 instruction cache partition and system memory 207.

For a system that supports "self snooping", the bus interface logic 211 within bus interface/L2 unit 202 typically detects the "self snoop" attribute attached to the processor request and searches these other locations (or effectively notifies other elements that a location should be searched) for the requested information. Again, some designers may choose to let all memory reads having a "self snoop" attribute pass over the system bus 206 so that this logic can be utilized. Other designers may choose to add such logic to the shortcut 210 path.

A third type of attribute defines whether or not the memory read is a "write back" type of memory read. A write back memory read allows for more enhanced system performance because any subsequent update (i.e., change after the read is made) to the information obtained from the memory read is stored in L1 or L2 cache rather than system memory 207.

By storing the subsequent update in cache rather than system memory 207, the performance of the system is enhanced because updates made to cache are faster than updates made to system memory 207. Because of the performance enhancement, there is an incentive to maximize the number of write back memory reads. Thus, in many cases write back memory reads are more common during the operation of a computing system than non write back memory reads.

Recall that whether or not it is efficient to deny use of the shortcut 210 for certain types of attributes depends upon the frequency of the attribute and the difficulty (or ease) of designing the ability to handle the complication presented by the attribute into the shortcut 210. Various embodiments may be configured to only utilize the shortcut 210 if the memory read is a write back memory read because write back memory reads have a higher frequency of occurrence as compared to non write back memory reads.

Here, adding logic that checks whether or not a processor request corresponds to a write back memory read (so that it may utilize the shortcut 210 whereas non write back memory reads may not) actually complicates the design of the shortcut path 210 somewhat as compared to a design that makes no distinction as between write back or non write back memory reads. However, depending upon the rate at which the processor submits requests and the overall rate at which the system memory 207 can perform reads for the processor, the advantage of the shortcut 210 may be lost if too many requests are passed along shortcut 210 such that substantial queuing is needed as a result of its heavy utilization.

Thus, because bus interface logic 211, 212 typically has one or more queue structures to account for the inability of the system memory 207 to be dedicated only to the needs of the processor (i.e., some degree of queuing of the processor's requests is expected so that the system memory 207 can serve other elements in the system) it may be more efficient from, a system. performance perspective and a design cost perspective to keep the majority of needed queue structures within the bus interface logic 211, 212 rather than the along the shortcut 210.

A fourth attribute involves the mode of the processor. Specifically, some memory reads may occur while the processor is in an abnormal mode or state. Some processors have abnormal operating modes as a result of legacy software. These abnormal modes are usually invoked or used on a small percentage of shipped processors. For example, processors associated with x86 based architectures (which was initially introduced by Intel Corporation, currently head-quartered in Santa Clara, Calif.) maintain a legacy operating mode, referred to as system management mode (SMM), that was mostly utilized in a prior technology era when software did not manage the power consumption of the system.

The SMM mode, which allows the processor to control system power consumption without the help of an operating system, is designed into current processors so that they are downward compatible with legacy software. Because the installation of such legacy software has become less and less frequent over time, only a small percentage of processors currently operate in this mode.

Because of the reduced utilization of a processor's abnormal modes, little commercial or performance advantage is likely to be gained by utilization of the shortcut 210 by processor requests made while the processor is in an abnormal mode. Thus, many embodiments may choose to send processor requests that were issued while in an abnormal mode across the system bus 206.

A fifth attribute involves whether or not the processor request involves "locked access" of the system bus 206. Some processor requests may have an attribute specifying that other devices can't use the system bus 206 once the request has been issued. This allows queue structures with bus interface logic 211, 212 holding processor requests to empty out. In a sense, the processor demands the attention of the system bus 206 to the exclusion of other system elements that may want to employ the bus 206.

Because the "locked access" attribute is designed to notify other devices that a locked access is about to occur, various embodiments may choose to send such requests through the system bus 206 rather than through the shortcut 210. Other embodiments may choose to allow the locked access request to use the shortcut 210.

Figure 3:
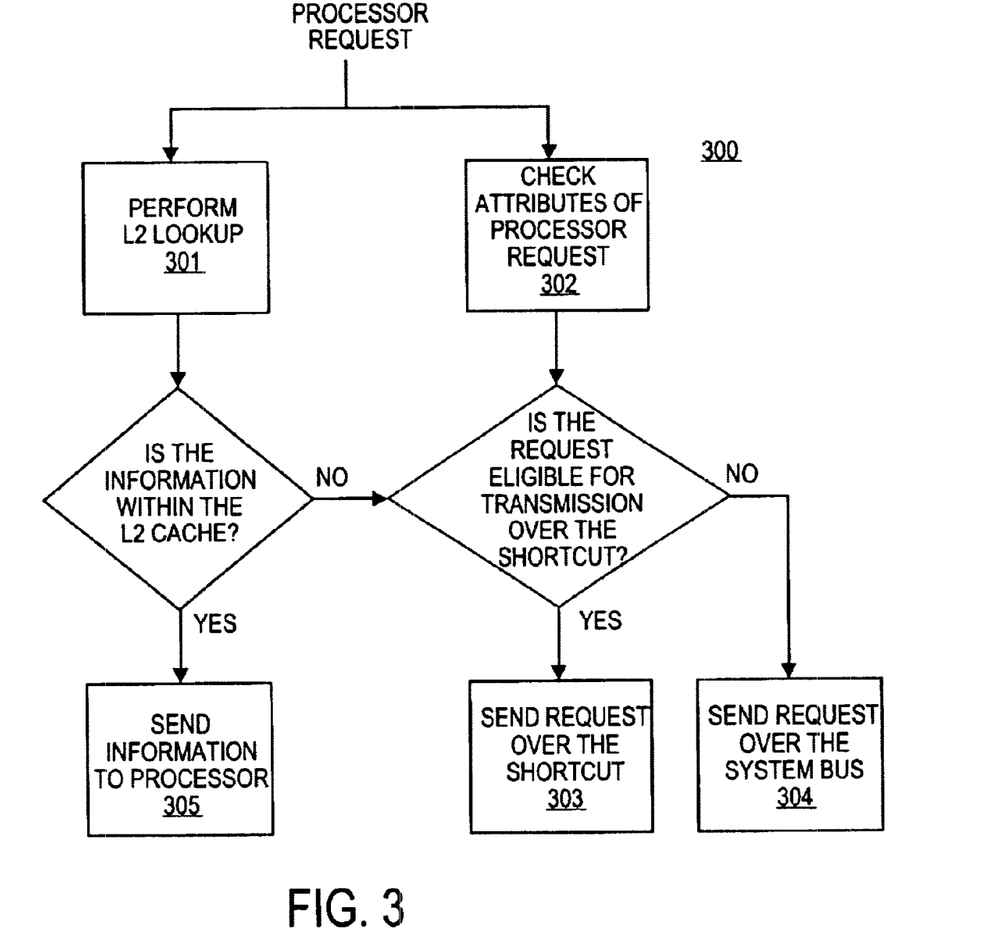
FIG. 3 shows a method that utilizes the shortcut of FIG. 2.

FIG. 3 shows a method that may be used to implement the shortcut 210 approach discussed above. Before, during or after an L2 lookup 301 for the information requested by a processor, the attributes of the request are checked 302 to see if the request qualifies for transmission along the shortcut. If the information is found within the L2 cache, the information is sent to the processor 305. If the information is not found in the L2 cache and if the request qualifies for transmission along the shortcut, the request is sent along the shortcut 303. Otherwise, the request is sent along the system bus 304.

Figure 4:
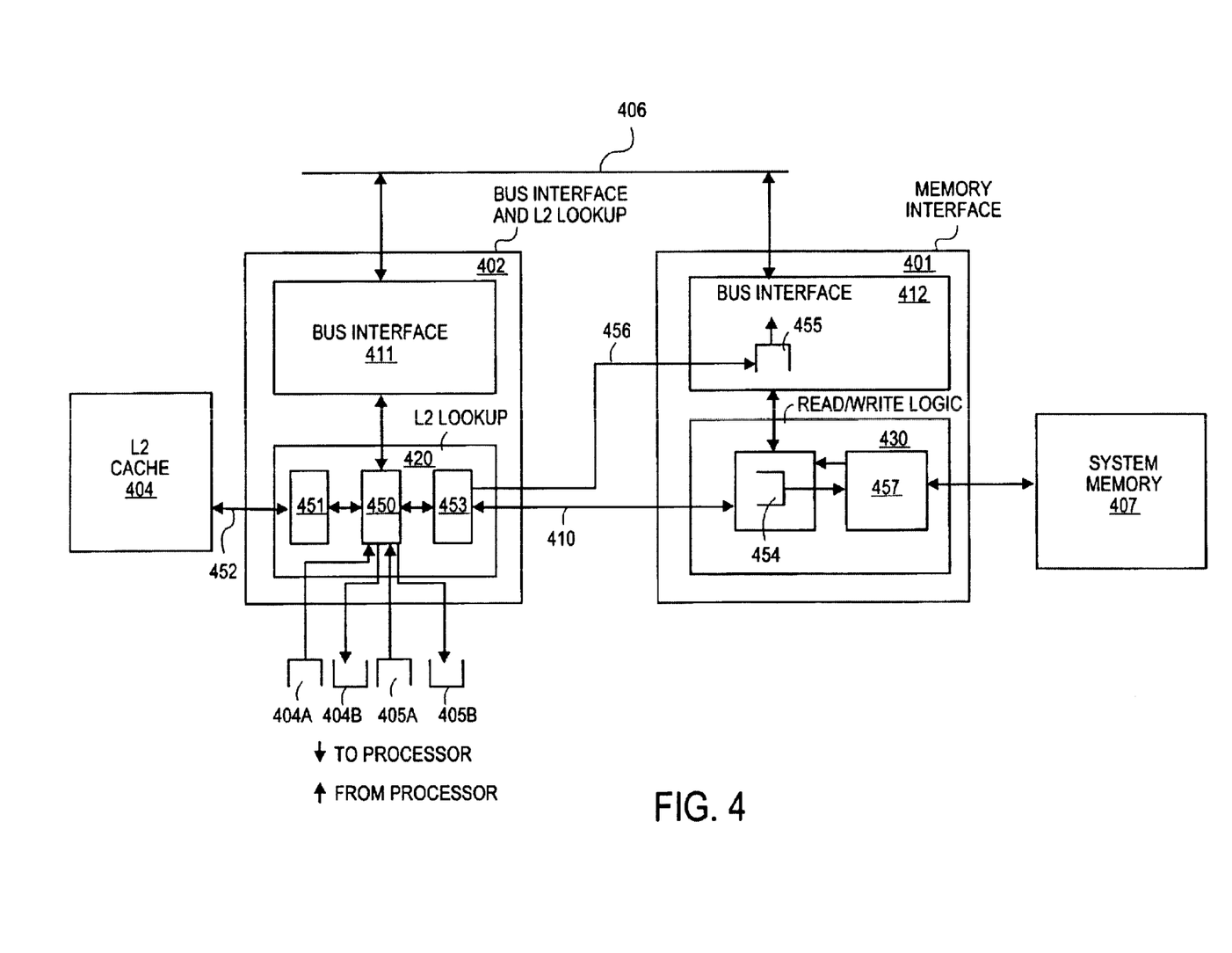
FIG. 4 shows a more detailed embodiment of the portion of the system architecture shown in FIG. 2.

FIG. 4 shows a detailed embodiment of a design that may be used to implement the shortcut approach discussed above. In the embodiment of FIG. 4, the bus interface/L2 lookup unit 402 is responsible for: 1) sending and receiving information to/from the system bus 406; 2) performing an L2 cache lookup; and 3) policing the requests from the outbound instruction fetch and data element queues 404a 405a so that requests having the proper attributes are directed along the shortcut 410 (while requests not having the proper attributes are directed to the system bus 406).

When a processor request is accepted from either queue 404a, 405a, L2 lookup request logic 450 requests back side bus logic 451 to perform an L2 lookup. The back side bus logic 451 couples the L2 cache to the L2 lookup request logic 450. Back side bus logic 451 is responsible for performing the L2 cache lookup. The backside bus 452 is used for accessing the contents of the L2 cache.

In parallel with the requesting of and the waiting for the results of the L2 cache lookup, the attributes of the processor request (from queue 404a or 405a) are forwarded to policing logic 453. Policing logic 453 then speculatively prepares a shortcut request to the read/write logic 430 found within the memory interface 401.

If the L2 cache lookup is successful (i.e., the sought for information is found in the L2 cache), the speculatively prepared request to the read/write logic 430 is extinguished (i.e., never sent to read/write logic 430) and the information retrieved from the L2 cache is forwarded to the processor. However, if the L2 cache lookup is not successful (i.e., the sought for information is not found within the L2 cache) and the attributes of the request allow the request to utilize the shortcut 410, the speculatively prepared shortcut request is transmitted to the read/write logic 430 within the memory interface unit 401.

Read/write logic 430 may also have an associated queue 454. If the queue 454 has room for the processor's request, the read/write logic 430 accepts the shortcut request (e.g., via a positive acknowledgment sent back to policing logic 453) and the processor request is sent to the read/write logic unit 430 where it is entered within the queue 454.

Note that requests from other elements within the system that desire access to the system memory 407 may be mixed with the processor's request within the queue 454. Some embodiments may choose to implement pre-emptive queuing within queue 454 for processor requests so that the processor request is served ahead of earlier arrived requests from other elements within the system.

It also possible that another queue 455 exists in the transmit direction (i.e., toward system bus 406) within the memory interface bus interface logic 412. The presence of queue's 454, 455 may be motivated due to operational speed differences between system memory 407 (i.e., read/write times) and the system bus 407 (bus throughput) and the trafficking concerns of the system. For example, if the full bandwidth of system bus 407 is greater than the read/write times associated with system memory 407, the system bus 407 could overload the system memory 407 if queue 454 was not present.

As another example, if system bus 406 is heavily utilized resulting in servicing delays of information desiring to use system bus 406, the speed at which the system bus 406 can serve the memory interface unit 401 may be less than the speed at which the system memory can read information destined for the system bus 406. Queue 455 prevents the bus interface logic 412 from being overloaded with information read from system memory 407.

Note that there is some probability, for any processor request sent along the shortcut 410, that the information desired by the processor was recently read from system memory 407 and is currently stored in queue 455. Thus, the policing logic 453 within the bus interface/L2 lookup unit 402 (or the read/write logic 430 within the memory interface unit 401) may be configured to search the contents of the queue 455 before the processor request is served from or entered within queue 454. As an example of just one embodiment, snoop line 456 is shown in FIG. 4 to indicate that the policing logic 453 searches queue 455 before a processor request is sent to queue 454.

When the processor's request within queue 454 is served by the read/write logic unit 412 (i.e., when the information desired by the processor is read from the system memory 407) the retrieved information (i.e., an instruction or data) is sent back to the policing logic 453 from where it is ultimately forwarded back to the appropriate processor inbound queue 404b or 405b (e.g., through L2 lookup request logic 450).

Note that the read/write logic unit 430 further comprises addressing circuitry 457 for properly addressing the system memory 407. In an embodiment, addressing circuitry 457 corresponds to Rambus based (such as a Rambus DRAM (RDRAM), Synchronous DRAM (SDRAM), etc.) addressing circuitry. In another embodiment, addressing circuitry 457 corresponds to Double Data Rate (DDR) based addressing circuitry. Other memory types may be addressed by addressing circuitry 457 as well.

It is important to point out that the processor may appear on a semiconductor chip together with one or all of the elements shown in FIGS. 2, and 4 (e.g., such as an embedded processor in a "system-on-chip" application). Thus, for example, in some embodiments the bus interface/L2 lookup unit 202, 402, and memory interface unit 201, 401 may be implemented upon the same semiconductor chip as the processor. The system memory 207, 407 may also be implemented on the same chip as the processor (e.g., in an application that employs embedded DRAM technology). In still other embodiments, the processor and one or more of the elements 201, 401, 202, 402, 207, 407, 206, 406, 204, 404 shown in FIGS. 2 and 4 may be implemented as separate semiconductor chips.

Note also that embodiments of this invention may be implemented not only within a semiconductor chip but also within machine readable media. For example, these designs may be stored upon and/or embedded within machine readable media associated with a software design tool used for designing semiconductor devices. Examples include VHSIC Hardware Description Language (VHDL) netlists, Verilog Register Transfer Level (RTL) netlists, and transistor level (e.g., SPICE or SPICE related files) netlists. Note that such netlists may be synthesized as well as synthesizable. Machine readable media also include media having layout information such as a GDS-II file. Furthermore, netlist files or other machine readable media for semiconductor chip design may be used in a simulation environment to perform the methods of the designs described above.

Thus, it is also to be understood that embodiments of this invention may be used as or to support software programs executed upon some form of processing core (such as the CPU of a computer) or otherwise implemented or realized upon-or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:

a bus interface/L2 cache lookup unit coupled to a first queue to receives requests for instructions, said bus interface/L2 cache lookup unit coupled to a second queue to receive requests for data elements, said bus interfaced/L2 cache lookup unit comprising three separate bus interfaces for three separate busses, said three bus interfaces further comprising: a) a first bus interface to couple to said L2 cache via a first bus; b) a second bus interface to couple to a memory interface unit via a second bus; c) a third bus interface to said memory interface unit via a third bus, said second bus interface from where those of said requests that:
1) cannot be satisfied by a lookup to L2 cache over said first bus and
2) are characterized according to one or more attributes are sent to said memory interface unit over said second bus after their L2 cache lookup and without crossing said first bus; and said third bus interface from where those of said requests that:
1), cannot be satisfied by a lookup to L2 cache over said first bus and
2) are not characterized according to said one or more attributes are sent to said memory interface unit over said third bus after their L2 cache lookup and without crossing said first bus.

2. The apparatus of claim 1 wherein said second bus interface is a system bus interface, said second bus being a system bus.

3. The apparatus of claim 1 wherein said second bus interface is a front side bus interface, said second bus being a front side bus.

4. The apparatus of claim 1 wherein said second bus interface further comprises a PCI bus interface, said second bus being a PCI bus.

5. The apparatus of claim 1 wherein said memory interface unit is a memory controller.

6. The apparatus of claim 1 wherein one of said one or more attributes further comprises a read for ownership (RFO) attribute.

7. The apparatus of claim 1 wherein one of said one or more attributes further comprises a self-snoop attribute.

8. The apparatus of claim 1 wherein one of said one or more attributes further comprises a write-back attribute.

9. The apparatus of claim 1 wherein one of said one or more attributes further comprises a system management mode attribute.

10. The apparatus of claim 1 wherein one of said one or more attributes further comprises a locked access attribute.

11. The apparatus of claim 1 wherein said first bus interface is a back side bus interface, said first bus being a back side bus.

12. The apparatus of claim 1 wherein said L2 cache further comprises SRAM memory cells.

13. An apparatus, comprising:

a) a n RDRAM system memory;

b) a system memory interface unit coupled to said system memory; and c) a bus interface/L2 cache lookup unit coupled to a first queue to receives requests for instructions, said bus interface/L2 cache lookup unit coupled to a second queue to receive requests for data elements, said bus interface/L2 cache lookup unit comprising three separate bus interfaces for three separate busses, said three bus interfaces further comprising: a) a first bus interface coupled to said L2 cache via a first bus; b) a second bus interface coupled to said system memory interface unit via a second bus; c) a third bus interface coupled to said memory interface unit via a third bus, said second interface from where those of said requests that:
1) cannot be satisfied by a lookup to L2 cache over said first bus and
2) are characterized according to one or more attributes are sent to said system memory interface unit over said second bus after their L2 cache lookup and without crossing said first bus, said third interface from where those of said requests that:
1) cannot be satisfied by a lookup to L2 cache and
2) are not characterized according to said one or more attributes are sent to said system memory interface unit over said third bus after their L2 cache lookup and without crossing said first bus.

14. The apparatus of claim 13 wherein said second bus interface is a system bus interface, said second bus being a system bus.

15. The apparatus of claim 13 wherein said second bus interface is a front side bus interface, said second bus being a front side bus.

16. The apparatus of claim 13 wherein said second bus interface further comprises a PCI bus interface, said second bus being a PCI bus.

17. The apparatus of claim 13 wherein one of said one or more attributes further comprises a read for ownership (RFO) attribute.

18. The apparatus of claim 13 wherein one of said one or more attributes further comprises a self-snoop attribute.

19. The apparatus of claim 13 wherein one of said one or more attributes further comprises a write-back attribute.

20. The apparatus of claim 13 wherein one of said one or more attributes further comprises a system management mode attribute.

21. The apparatus of claim 13 wherein one of said one or more attributes further comprises a locked access attribute.

22. The apparatus of claim 13 wherein said system memory interface unit is a memory controller.

23. The apparatus of claim 13 wherein said L2 cache further comprises SRAM memory cells.

24. The apparatus of claim 13 wherein said first interface is a back side bus interface, said first bus being a back side bus.

25. A method, comprising:
looking up over a first bus from an L2 cache a first processor request for an instruction or data element;
forwarding said first processor request along a second bus to a memory interface unit so as not to travel across said first bus, if said first request is characterized according to one of one or more attributes and said first request is not satisfied by said L2 cache lookup;
looking up over said first bus from an L2 cache a second processor request for an instruction or data element; and
forwarding said first processor request along a third bus to said memory interface unit so as not to travel across said first bus, if said second request is not characterized according to one of said one or more attributes and said second request is not satisfied by said L2 cache lookup for said second request.

26. The method of claim 25 further comprising queueing said first and second processor request into an outbound queue within said processor prior to said looking up and said forwarding.

27. The method of claim 25 further comprising speculatively preparing a shortcut request to be passed over said third bus for said second processor request while said L2 cache is being said looked up to satisfy said second processor request.

28. The method of claim 27 wherein said forwarding of said second processor request is in response to said L2 cache lookup result indicating that said L2 cache cannot satisfy said second processor request.

29. The method of claim 25 further comprising sending a third requested instruction or data element to said processor if a third processor request for an instruction or data element is found within said L2 cache.

30. The method of claim 25 further comprising reading, with said memory interface unit, said first requested instruction or data element from a memory that is coupled to said memory interface unit.

31. The method of claim 30 further comprising reading, with said memory interface unit, said second requested instruction or data element from said memory.

32. The method of claim 31 further comprising forwarding said second requested instruction or data to said processor.

33. The method of claim 27 wherein one of said one or more attributes further comprises a read for ownership (RFO) attribute.

34. The method of claim 27 wherein one of said one or more attributes further comprises a self-snoop attribute.

35. The method of claim 27 wherein one of said one or more attributes further comprises a write-back attribute.

36. The method of claim 27 wherein one of said one or more attributes further comprises a system management mode.

37. The method of claim 27 wherein one of said one or more attributes further comprises a locked access attribute.

38. An apparatus, comprising:
a semiconductor chip comprising a processor and circuitry to retrieve requests for data elements made by said processor and requests for instructions made by said processor, said circuitry comprising:
a) a back side bus interface to communicate with a cache via a back side bus that is coupled to said back side bus interface;
b) a front side bus interface to communicate with a memory controller via a front side bus that is coupled to said front side bus interface and that is separate from said back side bus, said front side bus interface to send to said memory controller over said front side bus and not over said back side bus those of said requests characterized by one or more attributes that were not satisfied by a lookup to said cache;
c) a shortcut bus interface to communicate with said memory controller without communicating over said front side bus or said back side bus via a shortcut bus that is coupled to said memory controller, said shortcut bus separate from said back side bus and said front side bus, said shortcut bus interface to send to said memory controller over said shortcut bus and not over said back side bus those of said requests not characterized by said one or more attributes that were not satisfied by a lookup to said cache.

39. The apparatus of claim 38 wherein said circuitry further comprises policing logic circuitry that speculatively prepares a communication for transmission through said shortcut bus interface for those of said requests not characterized by said one or more attributes prior to it being known whether they will be satisfied by their corresponding cache lookup.

40. The apparatus of claim 38 wherein one of said one or more attributes further comprises a read for ownership (RFO) attribute.

41. The apparatus of claim 38 wherein one of said one or more attributes further comprises a self-snoop attribute.

42. The apparatus of claim 38 wherein one of said one or more attributes further comprises a write-back attribute.

43. The apparatus of claim 38 wherein one of said one or more attributes further comprises a system management mode attribute.

44. The apparatus of claim 38 wherein one of said one or more attributes further comprises a locked access attribute.

45. A machine readable medium containing a description of semiconductor chip circuit design, said semiconductor chip circuit design comprising a design for:

a processor and circuitry to retrieve requests for data elements made by said processor and requests for instructions made by said processor, said circuitry comprising:
  a) a back side bus interface to communicate with a cache via a back side bus that is coupled to said back side bus interface;
  b) a front side bus interface to communicate with a memory controller via a front side bus that is coupled to said front side bus interface and that is separate from said back side bus, said front side bus interface to send to said memory controller over said front side bus and not over said back side bus those of said requests characterized by one or more attributes that were not satisfied by a lookup to said cache;
  c) a shortcut bus interface to communicate with said memory controller without communicating over said front side bus or said back side bus via a shortcut bus that is coupled to said memory controller, said shortcut bus separate from said back side bus and said front side bus, said shortcut bus interface to send to said memory controller over said shortcut bus and not over said back side bus those of said requests not characterized by said one or more attributes that were not satisfied by a lookup to said cache.

46. The machine readable medium of claim 38 wherein one of said one or more attributes further comprises a read for ownership (RFO) attribute.

47. The machine readable medium of claim 38 wherein one of said one or more attributes further comprises a self-snoop attribute.

48. The machine readable medium of claim 38 wherein one of said one or more attributes further comprises a write-back attribute.

49. The machine readable medium of claim 38 wherein one of said one or more attributes further comprises a system management mode attribute.

50. The machine readable medium of claim 38 wherein one of said one or more attributes further comprises a locked access attribute.

* * * * *

UNITED STATES PATENT AND TRADEMARK OFFICE
CERTIFICATE OF CORRECTION

PATENT NO. : 6,636,939 B1
DATED : October 21, 2003
INVENTOR(S) : George

It is certified that error appears in the above-identified patent and that said Letters Patent is hereby corrected as shown below:

Column 4,
Line 66, delete "if" and insert -- If --.

Column 6,
Line 61, delete the phrase "from, a system. performance" and insert -- from a system performance --.

Column 9,
Line 67, delete "receives" and insert -- receive --.

Column 10,
Line 55, delete "a n" and insert -- an --.
Line 60, delete "receives" and insert -- receive -- .

Signed and Sealed this

Sixth Day of July, 2004

JON W. DUDAS
*Acting Director of the United States Patent and Trademark Office*